(12) United States Patent
Schmierer

(10) Patent No.: US 8,950,914 B2
(45) Date of Patent: Feb. 10, 2015

(54) LIGHTING UNIT

(75) Inventor: Arne Schmierer, Kirchheim (DE)

(73) Assignee: SMR Patents S.a.r.l., Luxembourg (LU)

( * ) Notice: Subject to any disclaimer, the term of this patent is extended or adjusted under 35 U.S.C. 154(b) by 231 days.

(21) Appl. No.: 13/323,143

(22) Filed: Dec. 12, 2011

(65) Prior Publication Data

US 2012/0147614 A1 Jun. 14, 2012

(30) Foreign Application Priority Data

Dec. 10, 2010 (EP) .................. 10194440

(51) Int. Cl.
*B60Q 11/00* (2006.01)
*B60Q 1/26* (2006.01)
*B60R 1/12* (2006.01)

(52) U.S. Cl.
CPC ............ *B60Q 1/2665* (2013.01); *B60R 1/1207* (2013.01)
USPC ............ 362/494; 362/487; 362/543; 362/544

(58) Field of Classification Search
USPC ................ 362/249.01–249.02, 487, 494, 362/543–545, 800
See application file for complete search history.

(56) References Cited

U.S. PATENT DOCUMENTS

| 7,255,464 | B2 | 8/2007 | Rodriguez Barros et al. |
| 7,357,549 | B2 | 4/2008 | Günther |
| 7,492,281 | B2 | 2/2009 | Lynam et al. |
| 2004/0114384 | A1 | 6/2004 | Carter et al. |
| 2004/0190303 | A1 | 9/2004 | Mishimagi |
| 2010/0177523 | A1 | 7/2010 | Bisnack |

FOREIGN PATENT DOCUMENTS

| DE | 102005027512 | 12/2006 |
| EP | 0858932 | 8/1998 |
| EP | 1914118 | 4/2008 |
| EP | 2258977 | 8/2010 |
| WO | 2010055178 | 5/2010 |

OTHER PUBLICATIONS

European Search Report for application No. EP 10 19 4440 dated Apr. 14, 2011.

*Primary Examiner* — Evan Dzierzynski
*Assistant Examiner* — Meghan Dunwiddie
(74) *Attorney, Agent, or Firm* — Reising Ethington P.C.

(57) ABSTRACT

A lighting unit (10) with a housing (12) and a light disc (11) is suggested, which extends along a vehicle exterior mirror (1) with a housing covering the mirror head. The housing comprises at least two lighting means (14, 14', 14a, 14b), whereby the lighting means (10) carries out a first function as an indicator, and decouples light in a first decoupling region (5) according to the guidelines of the legal regulations. The lighting unit illuminates at least a second region, whereby the at least second decoupling region (6) lies closer on the vehicle, and the lighting unit (10) carries out the function of a warning display visible to the driver.

19 Claims, 4 Drawing Sheets

LIGHTING UNIT

BACKGROUND ART

1. Field of the Invention

The invention relates to a unitary lighting unit for the exterior mirror of a vehicle. More particularly, the invention relates to a unitary lighting unit, whereby a part of the lighting unit corresponds to an indicator, while another part of the lighting serves as a warning display for assistance systems.

2. Description of the Related Art

Conventional exterior mirrors have a design allowing the mirror head to be folded backwards in relation to the mirror base, by hand or driven by a motor, in a direction rearwards with respect to the direction of movement of the vehicle. In addition, the mirror glass bracket can normally be positioned in the mirror head from the inside of the vehicle. A perfect view is thus ensured for the driver, which results in better road safety. Many exterior mirrors comprise an indicator, e.g., a turn signal, which is provided on the front side of the mirror housing in the direction of movement. For road users who are next to or behind the exterior mirror, the indicator can generally not be seen, or only insufficiently. Therefore, additional LEDs are incorporated into the mirror design, which radiate against the direction of travel, and are integrated on the outermost edge of the exterior mirror in the indicator.

According to ECE regulations, an additional turn signal light in the exterior mirror should light up a region beginning from 5° from the longitudinal axis of the vehicle, up to 60° to the longitudinal axis of the vehicle in the opposite direction of movement.

A variety of solutions for indicators in the exterior rear view mirror is known from the related art. Indicator modules are integrated into the housing of an exterior mirror in the process. According to the design, these indicator modules contain optical fibers, reflectors, printed circuit boards, lenses and cover glass and illuminants. LEDs are increasingly used as illuminants due to the known advantages.

An embodiment is known in EP 0 858 932 A2. In this embodiment, an indicator module is formed, which comprises a light conductor. The light conductor forms a constant contour with the housing of an exterior mirror. The light of an LED is coupled at one end of the light conductor and transported over the whole length. The emission of the light takes place over the whole length of the light conductor, depending on the thickness of the decoupling devices and at the end of the light conductor. It has been shown that this solution is not sufficient for the optimal lighting of a lighting device. The desired light intensity is not achieved with the solution of the distant coupling of light and the transport of 5 to 20 cm.

A lighting unit is known in U.S. Pat. No. 7,357,549, which includes light conductor elements, into which at least one LED protrudes. In this embodiment, a light conductor is divided into several sections and includes a recess along its longitudinal extension. Due to the recess in the light conductor, the latter is weakened in its stability, and/or the external constant surface of the light conductor is disturbed by an elevation. Due to the light conducting material being optically clear, the light coupling point is visible from the outside, which distorts the harmonious impression of the light conductor.

U.S. Pat. No. 7,255,464, discusses a variety of embodiments of light modules. This reference does not, however, discuss the combination of two lighting units in one module. In this publication, no emission of light of a warning display on the vehicle side in the mirror housing is described.

Furthermore, solutions for displaying a hazardous situation are known in the related art, which are installed on and/or in the exterior mirror of a vehicle. Warning displays must be installed in such a way that they are noticed by the driver of the vehicle when they light up. A position on the inner housing cover of the exterior mirror is therefore appropriate.

Modules are known for these types of warning displays, which are controlled by an assistance system and light up in reaction to a control signal. An example is U.S. Pat. No. 7,492,281, which shows the use of a warning display in the housing cover. The warning display is designed as an independent module, and is mounted into the mirror head separately from other lighting devices.

All lighting elements known in the prior art for various functions of the exterior mirror are designed as individual components and are integrated into the openings provided for them.

SUMMARY OF THE INVENTION

A lighting unit for a side rear view mirror includes a housing and a light window, which extends along the longitudinal axis of a vehicle exterior mirror with a housing covering the mirror head, whereby the lighting unit carries out a first function as an indicator and decouples light in a first region following the guidelines of the legal regulations, and the lighting unit illuminates at least one second region, whereby the at least second decoupling region lies closer to the vehicle, and the lighting unit carries out the function of a warning display visible to the driver.

BRIEF DESCRIPTION OF THE DRAWINGS

The subsequent figures and description show embodiments of the invention, which illustrate the invention as an example.

DETAILED DESCRIPTION OF THE PREFERRED EMBODIMENTS

Figure 1:
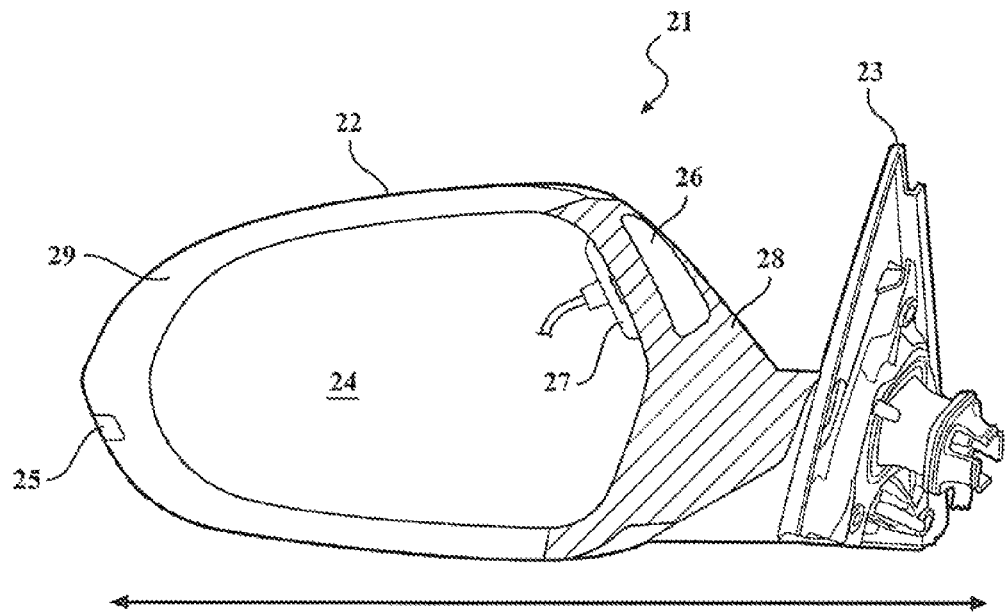
FIG. 1 shows the prior art.

FIG. 1 shows a vehicle exterior mirror 21 of the prior art, which consists of a mirror head 22 and a mirror base 23, which are connected together in an articulated manner. The vehicle exterior mirror 21 shown has a frame 29, which includes an opening 24 for installation of a mirror glass, a glass backing plate, a glass adjustment drive (none shown) as well as other electrical or electronic functions.

The mirror head 22 is sealed with the housing covers, which can be in one or several parts.

The vehicle exterior mirror 21 includes two separate lighting units. The first lighting unit is a mirror indicator, of which the light is emitted at the decoupling point of the indicator 25 at an angle of 5° to 15°. The path over which the indicator 25 extends is not indicated further in FIG. 1, but the indicator module extends along the longitudinal axis I of the vehicle mirror. The decoupling of the light of the indicator is not limited only to the decoupling region 25, but rather can run along the whole indicator. The decoupling point for the indicator function lies on the edge of the exterior mirror 21 turned away from the vehicle, so that other road users can observe the indicator. Furthermore, the vehicle exterior mirror comprises a warning display, which is installed as a warning display module 27. The warning display module 27 includes a decoupling surface 26, which is integrated into the housing cover 22 of the exterior mirror 21 flush thereto. The decoupling surface 26 of the warning display is advantageously situated in the region 28 on the side of the housing cover 22, which is turned towards the vehicle. Such an arrangement of lighting units in the exterior mirror is explained in the prior art. Two separate lighting modules are used and installed in the housing of the mirror (only warning display module 27 is shown). For this, different fastening mechanisms must be provided and the lighting modules are provided electrical signals and/or power separately. Since the installation space is limited in the exterior mirror 21, the use of lighting modules is often a problem.

In addition, the number of variants of the exterior mirror is increased. Depending on whether an indicator, a warning display or both lighting units are installed, the housing cover 22 of the vehicle exterior mirror 21 must be designed differently. According to the lighting units installed, the mirror housing cover 22 may include recesses, which are overlaid by the light windows 25, 26 of the respective units. The cover of the vehicle exterior mirror 21 can also be implemented in the same way, without a light function being integrated or activated.

Figure 2:
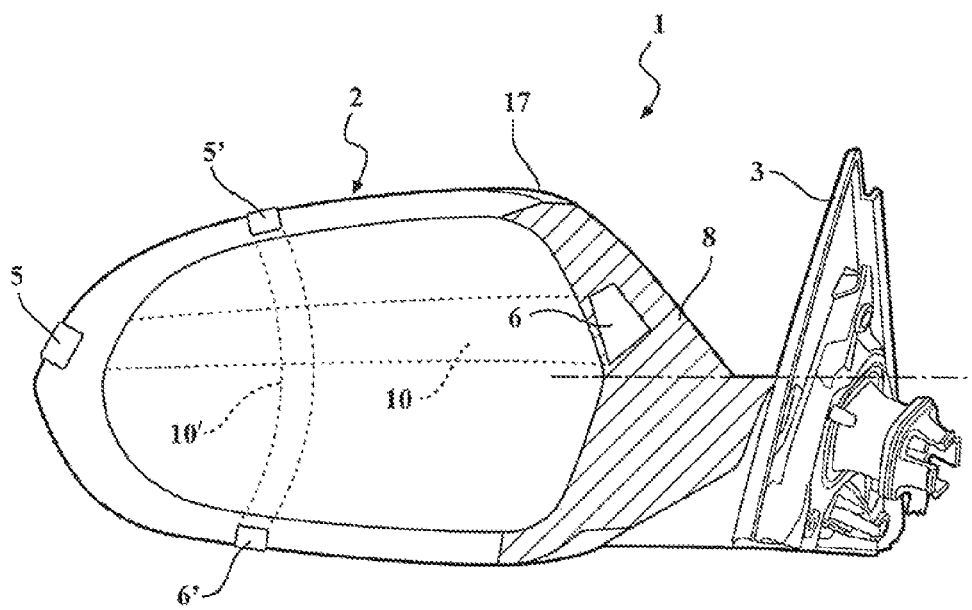
FIG. 2 and FIG. 3 show a first embodiment of a lighting unit in a front view and rear view.

FIG. 2 shows a first schematic embodiment of the invention. The vehicle exterior mirror 1 is secured to the motor vehicle (not shown) via a mirror bracket 3. The lighting module 10 extends along the rear side of the housing cover 17 of a mirror head 2 of the vehicle exterior mirror 1 in its longitudinal direction. The decoupling point of the indicator signal is indicated in region 5. In region 6, the decoupling surface of the warning display is visible, which is found in the preferred region 8 of the housing cover. Indicators as well as warning displays are accommodated in a single lighting module 10. The decoupling points 5, 6 of the respective light units strongly depend on the design of the vehicle exterior mirror 1. As a requirement, only the legal requirement for light intensity as well as the illumination angle for the indicator is to be fulfilled, and an expedient arrangement of the warning display, so that it can be seen by the driver. From this design, the light for at least two different functions is fed, and is decoupled at different points of the vehicle exterior mirror 1, and this is accomplished with a single module 10, which is inserted as a whole into the housing 2 of the vehicle exterior mirror 1.

The lighting module 10 according to the invention extends in the embodiment almost horizontally along a longitudinal axis of the vehicle exterior mirror 1. Embodiments with another arrangement of the lighting module are also possible. Expediently, the lighting module 10 extends from an outer decoupling point 5, which is disposed at an outer side of the vehicle exterior mirror 1 or the mirror frame border, over to the decoupling surface 6 of the warning display, which is situated in the upper half of the mirror housing 2. In the process, it is advantageous if the warning display 6 is installed in a region 8, which is situated along the inner side of the mirror housing 2. In an alternative embodiment, wherein like primed reference numerals represent like elements, a vertical path of the lighting module 10' is also possible. The decoupling point 5' for the indicator function then decouples on the upper edge of the mirror housing 2, for example, and the decoupling point 6' for the warning function on the lower edge on the mirror housing 2.

The advantage of the single lighting module 10, 10' is that the lighting module 10, 10', depending on the type of vehicle mirror 1, can be pre-assembled in the housing. Attachments are necessary, which can receive and retain the lighting module 10, 10'. All known possibilities such as clipping, adhesives, or welding can be used here.

Figure 3:
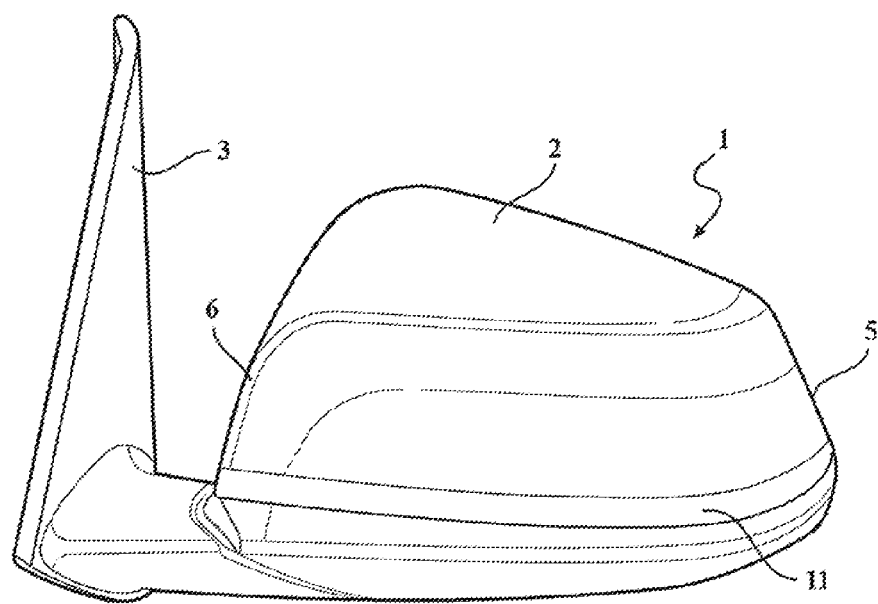

FIG. 3 shows an embodiment according to the invention in the direction of view, against the direction of movement of the vehicle. The mirror rear side is covered by the housing 2. The housing 2 is discontinued by a light window 11. The light window 11 extends across the housing 2 the exterior mirror 1 in its longitudinal direction. The light window 11 defines a contour that matches a contour of the housing 2. On the outermost point, the light for the indicator function is decoupled in the decoupling region 5. On the inner side 8 of the housing 2, on the vehicle side, the light is made available for the warning display by the decoupling point 6. For an embodiment of this type, in which the lighting module 10 is visible from the outside over its whole extension, a narrow light window 11 in the overall height, as shown here, is advantageous. The housing cover 2 may include a recess, into which the light window 11 is secured. Alternatively to this, a housing design in two or several parts is possible, so that different housing parts surround the lighting module 10. As can also be seen from FIG. 3, it is also possible in a simple way, for design reasons, to shade parts of the light window with the housing 2, and to provide only dedicated recesses on regions provided for this. To this end, housing parts are provided with decorative recesses, and the lighting module 10 extends behind the housing 2 inside the vehicle exterior mirror 1. In the process, the one piece design of the lighting module 10 is maintained.

Figure 4:
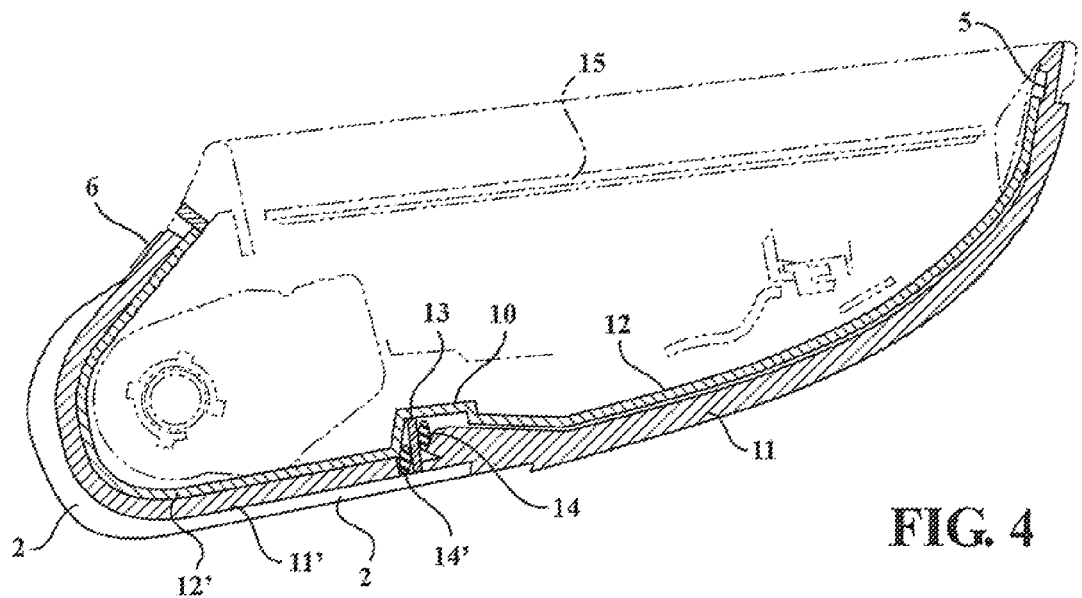
FIG. 4 shows a sectional view of the first embodiment.

FIG. 4 is a cross section of the vehicle exterior mirror 1 taken along the lighting module 10. In FIG. 4, a cross-section is shown through the housing 2, which includes a mirror glass, shown in phantom.

The exemplary lighting module 10 includes two portions that are delineated by a printed circuit board 13. The two portions of the light module 10 are represented by two light windows 11 and 11' that extend out and away from the printed circuit board 13. The light windows 11 and 11' follow the external contour of the exterior mirror. In the embodiment in FIG. 4, the light windows are simultaneously formed as light conductors for the transport of the light from the coupling point on the printed circuit board 13 out to the decoupling regions 5, 6 along the light window 11, 11', respectively. Light from the LEDs 14, 14', which are mounted on the printed circuit board 13, is fed into the light conductors, i.e. the light windows 11, 11'. The light of the LED 14 is emitted in reaction to the indicator control, and here follows the light conductor 11 up to the decoupling point 5. The light of the warning display is emitted via the LED 14' and led via the light window 11', which may be fabricated from an optical fiber out to the decoupling surface 6. In the process, the optical fiber(s) is/are here installed in a housing 12 of the lighting unit 10, which extends over the whole extension of the light window 11, 11'. The housing 12 of the lighting window 11, 11' includes a device for fastening to the housing 2 of the exterior mirror 1.

In an alternative embodiment, the light conductors are arranged parallel to the light window 11 as separate components behind the light window 11. The lighting module 10 then includes a separate light window, which is installed parallel to the light conductor.

In the embodiment according to FIG. 4, the optical fiber 11' is partly covered by the housing cover 2. A cover of the lighting module 10 against the outside by parts of the housing 2 at different points is expedient. In the region of the coupling on the printed circuit board, a covering of this type can shield the view onto the circuit.

The housing 2 is provided in particular in the region of the hinge of the mirror head 2 with a small radius of curvature. Light is only decoupled on the decoupling surface 6 for the warning display. Covering or not covering the optical fiber or light window is a question of the design of the individual mirror. A cover 2 is then only technically expedient when scattered radiation of the optical fiber is not to be prevented through narrow radii, as in the example in FIG. 4.

The printed circuit board 13 is positioned perpendicularly to the longitudinal expansion of the light conductor 11, 11' and simultaneously serves for blocking light from one region passing to another. If the LED 14 is activated for illuminating the indicator, only the light conductor region 11 illuminates, and the emission takes place mostly via the decoupling point 5.

If the warning display is controlled, the LED 14' is activated. The decoupling surface 6 of the warning display is illuminated.

Figure 5:
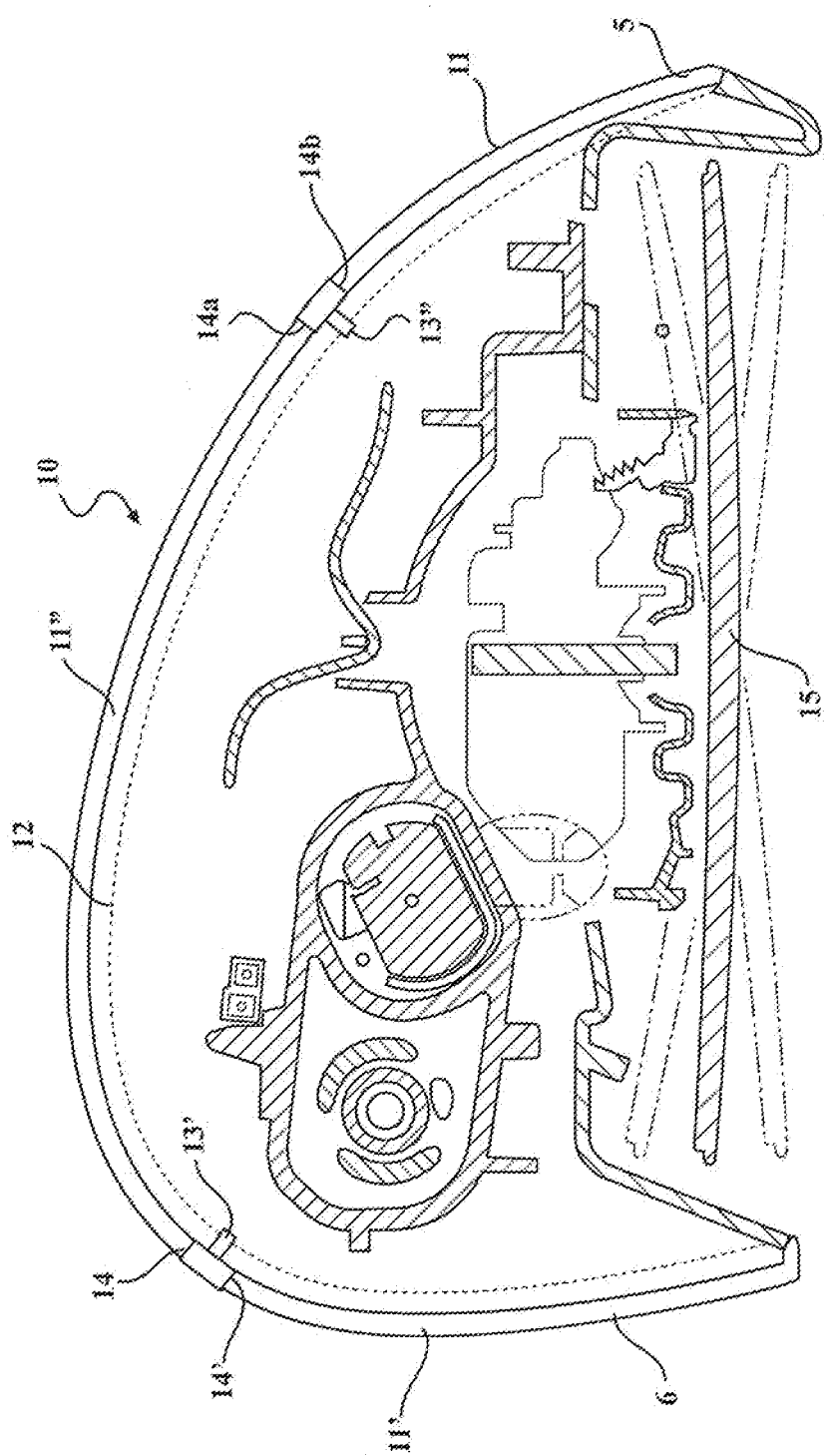
FIG. 5 shows a second embodiment.

FIG. 5 shows a further embodiment of the lighting module 10 according to the invention. The cross-sectional top view of the vehicle exterior mirror 1, which is of the door shoulder type, is shown here. Vehicle exterior mirrors 1 that are door shoulder mirrors are very suitable for the invention due to their hemispheric shell structure of its mirror head housing 2. In this example, the lighting module 10 includes two printed circuit boards 13', 13" with two coupling points and different LEDs. On the light coupling point closest the door, the LED 14' emits light for illuminating a warning. The LED 14' can here be designed as a colored LED, if an amber colored or red warning display is necessary. The LED 14 couples its light into a light conductor 11", just as the LED 14a, which is situated on a second coupling point. The light conductor region 11" between both of the coupling points serves the design of the vehicle and can be designed for any emission, since it does not have to follow any legal regulations. The LED 14b couples light into a third section 11 of the light conductor, and must meet the legal requirements with the decoupling of light on the point 5.

The housing 12 of the lighting module is only shown with dashed lines. It extends along all light conductor sections and includes all printed circuit boards with electrical controls. The lighting module can be directly installed between two parts of the housing cover 2.

Due to the three-way division of the light-emitting regions in this embodiment, the inclusion of a further function in the lighting module is possible. The region of the light window 11' remains reserved for a warning display, since the region is clearly visible for the driver, and the region 11 remains reserved for the indicator function. However, the central region can be controlled separately, and can therefore show a position light. It is also possible that this region is illuminated with white LEDs, and produces ambient lighting. The central region of the lighting unit can also be designed as a daytime running light.

Figure 6:
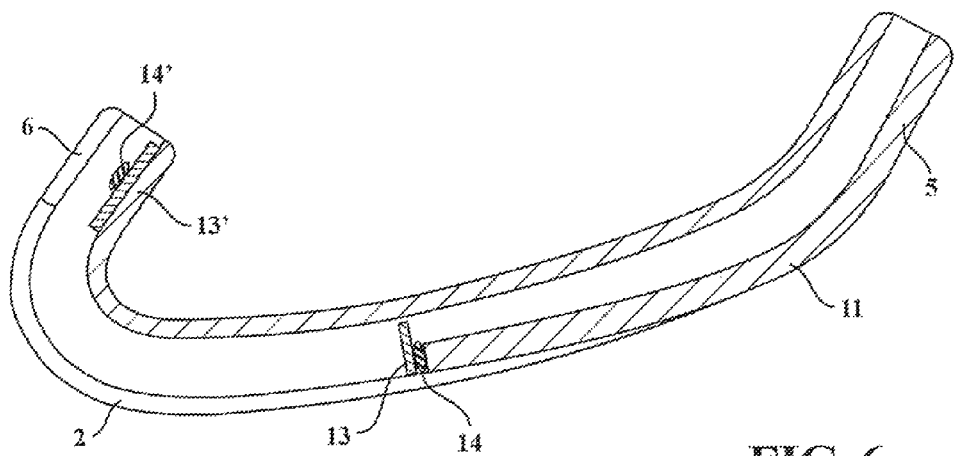
FIG. 6 shows a third embodiment.
Figure 7:
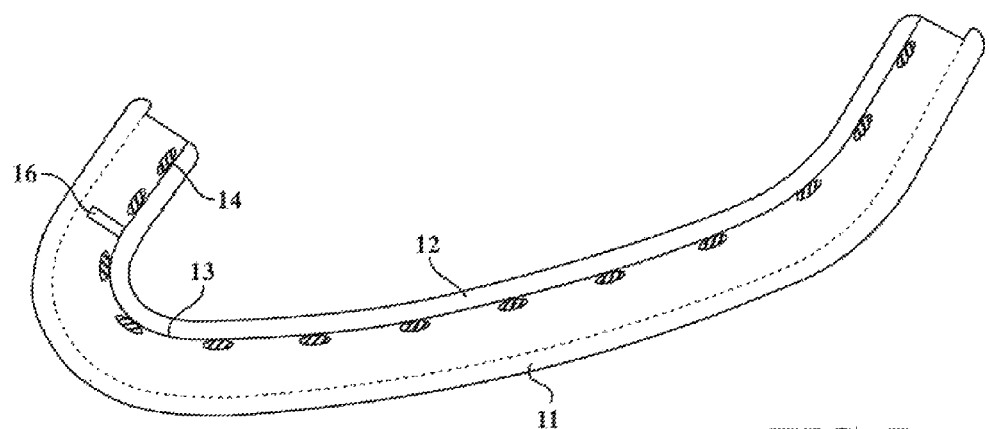
FIG. 7 shows a fourth embodiment.

FIG. 6 and FIG. 7 show two further embodiments of the lighting module, which present a hybrid solution with a light conductor 11 and a direct light emission through a light window, as well as a solution without a light conductor. According to FIG. 6, the solution according to the invention also comprises a division. The lighting unit is divided into two regions by a printed circuit board 13. The first region with the optical fiber 11 serves as an indicator and decouples light via the decoupling point 5. The light is coupled via an LED, which is attached to a printed circuit board 13. However, other coupling possibilities are also possible, such as the coupling via recesses in the optical fiber. A second printed circuit board 13' is mounted in the second region of the lighting unit. A suitable illuminant, generally at least one further LED 14', is situated on this printed circuit board. The light of the LED 14' is decoupled by the decoupling surface 6 of the warning display.

An example is shown in FIG. 7, which does not have an optical fiber. A curved, rigid or flexible printed circuit board is installed in the housing of the lighting unit 10. A variety of LEDs are mounted on the printed circuit board. These LEDs are either regularly arranged over the whole region of the lighting unit, or are specifically arranged closer together in the regions to be illuminated. The housing 12 of the lighting unit 10 is covered by a light disc 11. Furthermore, it is possible to install reflector means, in order to show the light of the LEDs in a suitable manner. In order to separate both of the regions of the lighting unit, it is also possible to install a baffle 16, so that the light of the warning display does not intersperse in the region of the indicator and vice versa. For the individual embodiments of the regions with combinations of rear wall housing, reflectors, lighting, optical fibers and light windows, very different embodiments are available to a person skilled in the art for implementation of the invention.

The integrated design of the lighting element 10 presents a challenge for the installation depth. A modern exterior mirror is limited in its volume. Significant installation depths of the lighting module are above all not possible in the region of the articulated connection of the mirror head onto the mirror base, as well as on the outermost point of the exterior mirror.

Therefore, light conductor solutions or solutions with flexible conducting paths or preformed printed circuit boards are preferred.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

KEY

1. Exterior mirror
2. Mirror head
3. Mirror base
4. Opening for mirror glass
5. Decoupling region—indicator
6. Decoupling surface—warning display
7. Warning display module
8. Internal housing cover
9. Mirror frame
10. Lighting unit
11. Light window
12. Module housing
13. Printed circuit board
14. LEDs
15. Mirror glass
16. Baffle
17. Housing cover

PRIOR ART

21. Exterior mirror
22. Mirror head
23. Mirror base
24. Opening for mirror glass
25. Decoupling region—indicator
26. Decoupling surface—warning display 27. Warning display module
28. Internal housing cover
29. Mirror frame

The invention claimed is:

1. A lighting unit (10) for a vehicle exterior mirror (1) with a cover (2) covering a mirror head, said lighting unit (10) comprising:
   a housing (12) extending along a portion of the housing cover (2);
   a light window (11) extending along said housing (12) and defining a first decoupling region (5) and a second decoupling region (6) oriented to face a driver;
   a baffle extending up through said light window (11) to divide said light window (11) into first (11) and second (11') light window portions;
   a first light source adjoining said first light window portion (11) for transmitting a first light through said first light window portion (11) toward said first decoupling region (5); and
   a second light source adjoining said second light window portion (11') for transmitting a second light through said second light window portion (11') toward said second decoupling region (6), whereby said first light source carries out a first function as an indicator by emitting the first light out of said first decoupling region (5), and said second light source carries out a second function as a warning display directed toward and visible to the driver by transmitting the second light out of said second decoupling region (6) toward the driver.

2. A lighting unit (10) according to claim 1, wherein said second decoupling region (6) decouples the second light from said second light window portion (11') adjacent a vehicle-sided region (8) of the cover (2) of the vehicle exterior mirror (1).

3. A lighting unit (10) according to claim 1, wherein said housing (12) contains at least one section of a light conductor.

4. A lighting unit (10) according to claim 1, wherein said baffle (16) is a printed circuit board (13) having a first side and a second side, and that said first light source is secured to said first side of said printed circuit board and said second light source is secured to said second side of said printed circuit board.

5. A lighting unit (10) according to claim 1, wherein said light window includes a central region (11") disposed between said first (11) and second (11') light window portions and has the function of a position light.

6. A lighting unit (10) according to claim 1, wherein said light window includes a central region (11") disposed between said first (11) and second (11') light window portions and has the function of an ambient lighting.

7. A lighting unit (10) according to claim 1, wherein said first and second light sources include LEDs and/or a light-guiding light conductor.

8. A lighting unit (10) according to claim 1, wherein the functions performed by said first and second light sources include indication, ambient lighting, alarm displays, information displays, position lights or daytime running lights.

9. A lighting unit (10) according to claim 1, wherein said lighting unit extends from the inside along the cover (2) of the vehicle exterior mirror (1) and extends along the whole length of the cover (2).

10. A lighting unit (10) according to claim 1, wherein said lighting unit is adapted to have a region of said light window (11) covered by the cover (2) of the vehicle exterior mirror (1).

11. A lighting unit (10) for a vehicle exterior mirror (1) with a cover (2) covering a mirror head, said lighting unit (10) comprising:
   a housing (12) extending along a portion of the housing cover (2);
   a light window (11) extending along said housing (12) and defining a first decoupling region (5) and a second decoupling region oriented to face a driver;
   a light source disposed adjacent said light window (11) for transmitting light toward said first decoupling region (5) and independently transmitting light toward said second decoupling region (6), whereby the light from said light source directed toward said first decoupling region (5) carries out a first function as an indicator, and the light from said light source directed toward said second decoupling region (6) is emitted toward the driver to carry out a second function as a warning display visible to the driver.

12. A lighting unit (10) according to claim 11 wherein said light source defines a first light source and a second light source such that said first light source emits light out therefrom toward said first decoupling region (5) and said second light source emits light out therefrom toward said second decoupling region (6).

13. A lighting unit (10) for a vehicle exterior mirror (1) with a cover (2) covering a mirror head, said lighting unit (10) comprising:
   a housing (12) extending along a portion of the housing cover (2);
   a first light window (11) extending along said housing (12) and defining a first decoupling region (5);
   a first light source (14b) coupled to said first light window (11) at an end of said first light window (11) opposite said first decoupling region (5);
   a second light window (11') extending along said housing (12) and defining a second decoupling region (6);
   a second light source (14') coupled to said second light window (11') at an end of said second light window (11') opposite said second decoupling region (6);
   a third light window (11") extending along said housing (12) between said end of said first light window (11) and said end of said second light window (11'), both opposite the respective first (5) and second (6) decoupling regions, said third light window (11") emitting light out therefrom independently from said first (11) and second (11') light windows.

14. A lighting unit (10) according to claim 13, including a fourth light source (14a) disposed adjacent said first light source (14b) for emitting light into said third light window (11") in a direction opposite said first light source (14b).

15. A lighting unit (10) according to claim 14, including a fifth light source (14) disposed adjacent said second light source (14') for emitting light into said third light window (11") in a direction opposite said second light source (14').

16. A lighting unit (10) according to claim 15, wherein said second decoupling region (6) decouples the second light from said second light window portion (11') adjacent a vehicle-sided region (8) of the cover (2) of the vehicle exterior mirror (1).

17. A lighting unit (10) according to claim 13, wherein said first and second light sources include LEDs and/or a light-guiding light conductor.

18. A lighting unit (10) according to claim 13, wherein the functions performed by said first and second light sources include indication, ambient lighting, alarm displays, information displays, position lights or daytime running lights.

19. A lighting unit (10) according to claim 13, wherein said lighting unit extends from the inside along the cover (2) of the vehicle exterior mirror (1) and extends along the whole length of the cover (2).

\* \* \* \* \*